(12) United States Patent
Olshvanger et al.

(10) Patent No.: US 7,432,518 B2
(45) Date of Patent: Oct. 7, 2008

(54) ENTRANCE WINDOW FOR GAS FILLED RADIATION DETECTORS

(75) Inventors: Boris A. Olshvanger, North York (CA); Gregory Bogorodzki, North York (CA)

(73) Assignee: Canberra Industries, Inc., Meriden, CT (US)

( * ) Notice: Subject to any disclaimer, the term of this patent is extended or adjusted under 35 U.S.C. 154(b) by 282 days.

(21) Appl. No.: 10/657,861

(22) Filed: Sep. 10, 2003

(65) Prior Publication Data

US 2007/0235667 A1 Oct. 11, 2007

(51) Int. Cl.
*G21C 11/00* (2006.01)

(52) U.S. Cl. ............... 250/515.1; 250/505.1; 250/517.1

(58) Field of Classification Search .... 250/505.1–519.1
See application file for complete search history.

(56) References Cited

U.S. PATENT DOCUMENTS

| | | | |
|---|---|---|---|
| 3,296,478 A | | 1/1967 | Ichinokawa |
| 3,654,469 A | * | 4/1972 | Kantor ................... 250/385.1 |
| 3,786,270 A | * | 1/1974 | Borkowski et al. ........ 250/385.1 |
| 3,916,200 A | | 10/1975 | Sparks, Jr. et al. |
| 3,979,593 A | * | 9/1976 | Spragg et al. ............... 250/364 |
| 4,178,509 A | | 12/1979 | More et al. |
| 4,500,786 A | * | 2/1985 | Britten et al. ............... 250/389 |
| 4,543,483 A | * | 9/1985 | Genrich ...................... 250/374 |
| 4,707,606 A | * | 11/1987 | Keller ......................... 250/374 |
| 4,914,720 A | * | 4/1990 | Knodle et al. ............... 250/343 |
| 4,933,557 A | | 6/1990 | Perkins et al. |
| 5,013,922 A | | 5/1991 | Little et al. |
| 5,340,989 A | * | 8/1994 | Berthold et al. .......... 250/385.1 |
| 5,345,083 A | | 9/1994 | De Koning |
| 5,731,584 A | * | 3/1998 | Beyne et al. ................ 250/374 |
| 5,742,061 A | * | 4/1998 | Lemonnier et al. ........ 250/385.1 |
| 2003/0155518 A1 | * | 8/2003 | Francke ................... 250/385.1 |

* cited by examiner

*Primary Examiner*—Jack I. Berman
*Assistant Examiner*—Andrew Smyth
(74) *Attorney, Agent, or Firm*—David W. Carstens; Carstens & Cahoon, LLP

(57) ABSTRACT

In a preferred embodiment, an entrance window for a gas filled radiation detector, including: a plastic core with electro conductive coatings on both an inner side and an outer side of the plastic core.

22 Claims, 2 Drawing Sheets

ENTRANCE WINDOW FOR GAS FILLED RADIATION DETECTORS

BACKGROUND OF THE INVENTION

1. Field of the Invention

The present invention relates to radiation detectors and, more particularly, but not by way of limitation, to a novel entrance window for gas filled radiation detectors.

2. Background Art

While the present invention is described with reference to gas filled proportional radiation detectors, it is applicable as well to any gas filled radiation detectors.

Large area gas filled proportional detectors are used extensively in health physics for surface contamination detection, particularly for detection of radioactive contamination of personnel. Sealed proportional detectors are preferable in practical applications because they do not require constant gas supply and the associated periodical replacement of gas bottles. This not only reduces the operating costs, but also minimizes the possible out of service time related to the gas bottle replacement.

The efficiency of a detector is a critical parameter that affects important properties of a contamination detection instrument: Minimum Detectable Activity (MDA) and monitoring time (which is especially critical in case of monitoring people). The higher the efficiency of a detector, the lower the MDA and the shorter the monitoring time. The detector efficiency directly depends on the radiation absorption by the entry window. This absorption in turn depends on the surface density of a window material. Practical upper limit of the window thickness for beta sensitive detectors in terms of overall surface density is about 5 mg/cm$^2$.

Only three light metals can be considered as window materials: beryllium (Be), aluminum (Al) and titanium (Ti). Utilization of the beryllium windows in large area detectors (larger then 100 cm$^2$) is practically impossible because of its high cost. Aluminum with its specific density of 2.7 g/cm$^3$ allows manufacturing of inexpensive foils with the surface density of 5 mg/cm$^2$ and the thickness of 18.5 µm. Unfortunately, Al is known as a very porous material and there is high probability of the presence of pinholes in such a thin foil. Finally, titanium has a specific density of 4.5 g/cm$^3$. Cold rolling technology allows manufacturing of relatively inexpensive foils of thickness down to 10 µm, corresponding to a surface density of 4.5 mg/cm$^2$. The manufacturing process leads however to the inherent defects like micro cracks that have the tendency to migrate and even to develop to pinholes under the influence of a mechanical stress. It is a stochastic process and may take unpredictable time (from days to years). Certainly this is a very undesirable effect from the point of view of the reliability and the lifespan of a detector.

Obviously, the operating lifetime of a detector is a very critical parameter. In the case of gas proportional detectors there is practically no inherent limitation other then the gas leakage, or a gas filling contamination. It is known that one of the biggest practical problems with sealed proportional detectors is the leakage of a counting gas through detector windows. When thin metal foils are used as a window material, the leakage may become a problem due to the reasons outlined above. This affects the detector production yield and detector lifespan. Practically, the average lifespan is in the range of 12-24 months. It is also inconsistent from one detector to another due to the statistical spread of defects in window materials.

Donachie, Matthew, *Titanium, A Technical Guide*, ASM, 2000, and Tada, Hiroshi, *The Street Analysis of Cracks, Handbook*, ASM, 2000, discuss the technological problems with manufacturing this metal foils and inherent micro-defects in these foils that, over time and under mechanical stress, may eventually develop into bigger cracks and pinholes and lead to gas leakages and, consequently, to premature detector failures.

In flow detectors, metallized plastic materials have been used for years. They feature low surface density (even down to 0.4 mg/cm$^2$) but also relatively high gas permeability. Such a technical solution is used, for example in U.S. Pat. No. 3,296,478, in which an entrance window is made from polycarbonate resin, less than 1 µm in thickness. This window can work only in flow detectors and is not useful for sealed counters. U.S. Pat. No. 5,345,083 describes an entrance detector window made from polypropylene or polyethylene terephthalate coated on the inner side with gold, platinum or iridium. This window also cannot work in sealed detectors and is suitable only for gas flow units.

In recent years, a number of so-called high barrier plastic materials have been developed. They feature very low gas permeability, especially when metal coated. The choice of the thickness is limited though. Still, there are a few materials available that meet in this regard the requirements of a detector window (thickness is the range 12-36 µm). Commercially available barrier foils do not have metal coatings sufficient for detector applications: the coating (if any) is usually on one side only and its thickness is insufficient to provide the required electrical conductivity and light tightness.

Accordingly, it is a principal object of the present invention to provide a radiation detector window for sealed radiation detectors that overcomes the known and described above problems with existing window materials.

It is a further object of the invention to provide such a radiation detector window for sealed detectors that limits the internal pressure drop to less than 10% in 5 years.

It is another object of the invention to provide such a radiation detector window that has a total surface density below about 5 mg/cm$^2$.

It is an additional object of the invention to provide such a radiation detector window that has good electrical conductivity (surface resistivity less than about 1 Ohm/square).

Yet a further object of the invention is to provide such a radiation detector window that has good light tightness (optical density of at least about 4).

Yet an another object of the invention is to provide such a radiation detector window that has good adhesion of metal coatings to the plastic core.

Yet an additional object of the invention is to provide such a radiation detector window that has high quality of surface (no pinholes or other defects).

A further object of the invention is to provide such a radiation detector window good and stable mechanical properties.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an entrance window for a gas filled radiation detector, comprising: a plastic core with electro conductive coatings on both inner and outer side of said plastic core.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
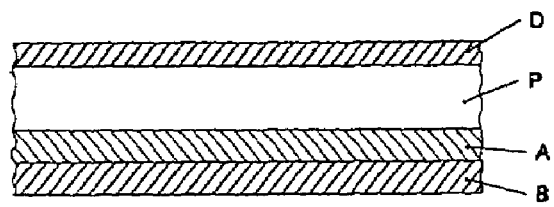
FIG. 1 is fragmentary, cross-sectional view of a radiation detector window constructed according to the present invention.

In general, the invention is directed to a window for a sealed gas proportional radiation detector having the structure: metal-plastic-metal. The core layer of the window is made from an oriented high barrier plastic material, featuring very low gas permeability. The inner side of this plastic core is coated with at least two layers of metals, usually chromium and aluminum. The number or coating layers and the selection of their thicknesses ensures low contribution to the total surface density of the window, providing at the same time sufficient barrier properties of window structure and required electrical conductivity. The outer side of the plastic window material is usually coated with aluminum to protect the plastic core from absorption of atmospheric gases, especially water vapor, and to improve mechanical stability and optical tightness of the window. Low total surface density of the window results in a low absorption of beta and alpha radiation that secures high efficiencies of detection of the mentioned types of radiation. Low gas permeability guaranties a long operating lifetime of detectors. Optimization of parameters of the plastic-based window material and its metal coatings allows combing the advantages of both sealed and flow proportional detectors in a sealed detector that is alpha/beta/gamma sensitive. Its detection efficiency is close to that of flow detectors, but is does not require constant gas supply to operate. Because of the high reliability, the detector can also be operated with expensive noble gases, such as xenon and krypton, without the risk of losing them due to leakage through the window.

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

FIG. 1 illustrates an entrance window, constructed according to the present invention, and constituting the simplest embodiment of the invention. A high barrier plastic core film "P" is used. For example, "P" may be RHB-12, a coextruded polyethylene terephthalate (PET) film, available in 12 μm thickness from Mitsubishi Polyester Film, GmbH, Wiesbaden, Germany (surface density 1.7 mg/cm$^2$); Hostaphan-5000, a PET film available in 19, 23, and 36 μm thicknesses from Mitsubishi Polyester Film, LLC, Greer, S.C. 29652, USA (equivalent surface densities are 2.6, 3.2, and 5.0 mg/cm$^2$, respectively); or EVAL-VM, or EVAL-XL-M, biaxially oriented PET films available in 12 and 15 μm thicknesses, respectively, from Kuraray Co. Ltd., Tokyo, Japan (surface densities 1.4 mg/cm$^2$ and 1.8 mg/cm$^2$, respectively). The selection of materials with significantly lower surface densities than those of available metal foils ensures lower absorption of alpha and beta radiation in the detector entrance window.

Plastic films used as window materials must be metallized. Metallization of a plastic core provides the following:

Improves the barrier properties (reduces the gas permeability).

Ensures electrical conductivity of the inner side of the window that is needed for the proper operation of a detector.

Ensures the light tightness of the window.

Gives the mechanical protection to the outer of the plastic core.

Continuing to refer to FIG. 1, the best materials for the outer coating, "D" are aluminum, nickel, and inconel, for example. The thickness of the outer coating layer "D" is approximately 400 Å for aluminum and 200 Å for nickel, which in terms of surface density are 0.011 mg/cm$^2$ and 0.018 mg/cm$^2$, respectively. Aluminum is the easiest to apply from a technological point of view. It is also the cheapest and results in the lower surface density. Nickel and inconel give a harder metal layer and better protection of a plastic core at the expense of higher manufacturing cost and increased surface density.

The inner side of plastic core "P" is coated with a thin layer of chromium (50-100 Å) or other heavy metal, "A", followed by a thicker layer (400-500 Å) of a light metal "B". Chromium, nickel, silver, or gold are preferred as heavy metals, aluminum or titanium as light metals.

Figure 2:
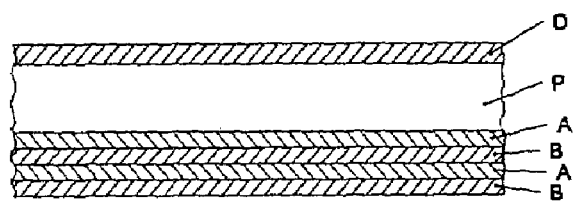
FIG. 2 is a fragmentary, cross-sectional view of a further embodiment of the present invention.
Figure 3:
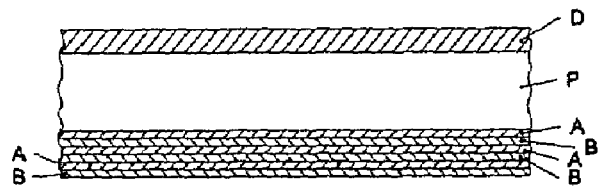
FIG. 3 is a fragmentary, cross-sectional view of another embodiment of the present invention.

FIGS. 2 and 3 illustrate the provision of, respectively, two and three inner layers "A"/"B" pairs of coatings. The repetition of "A"/"B" layers is what finally gives a multi-layer structure. The greater the number of "A"/"B" pairs, the better the reliability of a window. That is, the probability of the occurrence of pinholes is lower, but the manufacturing cost is higher. The total surface density of the coating preferably does not exceed about 0.3 mg/cm$^2$. Practically, the number of "A"/"B" pairs is usually one to five.

Figure 4:
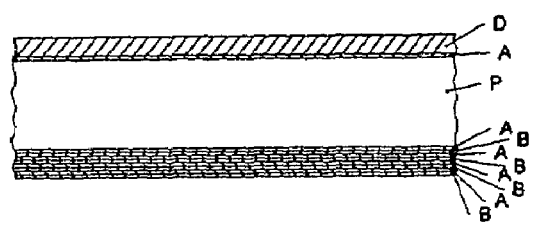
FIG. 4 is a fragmentary, cross-sectional view of an additional embodiment of the present invention.

FIG. 4 illustrates that, for improved adhesion of the outer side coating "D", an additional thin layer "A" (50-100 Å) of chromium is applied directly on the surface of plastic film "P".

Figure 5:
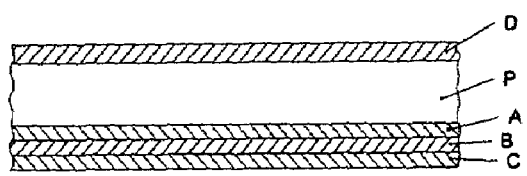
FIG. 5 is a fragmentary, cross-sectional view of yet a further embodiment of the present invention.

FIG. 5 illustrates a triple inner layer comprising a thin layer "A" of chromium (50-100 Å) followed by a thicker layer "B" (300-400 Å) of light metal, as above, and finally followed by a usually slightly thinner layer "C" (200-300 Å) of a heavy metal, such as nickel or gold. Layers "B" and "C" are the main metal layers, ensuring good electrical conductivity of the inner side of the window and its light tightness. Layer "C" reduces the probability of pinholes that improves light tightness and permeability properties.

Figure 6:
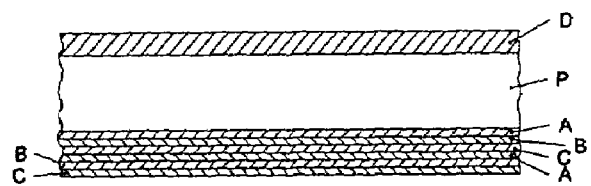
FIG. 6 is a fragmentary, cross-sectional view of yet another embodiment of the present invention.

FIG. 6 illustrates that additional "A"/"B"/"C" layers may be provided for improved coating quality. Again, the "A"/"B"/"C" layers may be repeated a few times, but the total surface density of the coating should not usually exceed about 0.3 mg/cm$^2$. The greater the number of layers, the better the reliability of a window, but at the expense of greater cost.

Application of the various metal layers can be effected through conventional vacuum metallization techniques, such as, for example, physical vapor deposition (PVD).

An example of a practical implementation of the invention is a one metal layer pair structure, "A"/"B" on a EVAL-XL-M plastic core "P" (FIG. 1). Layer "C" is aluminum about 400 Å thick (surface density about 0.01 mg/cm$^2$). "P" is 15 μm (surface density 1.8 mg/cm$^2$). "A" is chromium (50-80 Å thick) (surface density about 0.005 mg/cm$^2$) and "B" is aluminum about 450 Å thick (surface density about 0.01 mg/cm$^2$). The total surface density is about 0.027 mg/cm$^2$), which is only about 1.5% of the surface density of the EVAL-XL-M plastic core "P". According the manufacturer of the EVAL-XL-M material, the transmission rate specifications of the material are 0.0013 cm$^3$/(100 in$^2$×24 hrs×atm.). Using this figure and taking into account the metallization of the plastic core "P", the theoretical time needed for the detector gas pressure to drop by 10% is about 54 years.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The invention claimed is:

1. An entrance window for a gas filled radiation detector, comprising: a plastic core with electro conductive coatings on both an inner side and an outer side of said plastic core, wherein said inner side is coated with at least two metals.

2. An entrance window for a gas filled radiation detector, as defined in claim 1, wherein: said plastic core is a high barrier plastic film of low surface density.

3. An entrance window for a gas filled radiation detector, as defined in claim 1, wherein: said plastic core is a polyethylene terephthalate film.

4. An entrance window for a gas filled radiation detector, as defined in claim 3, wherein: said polyethylene terephthalate film is multi-layer and oriented.

5. An entrance window for a gas filled radiation detector, as defined in claim 1, wherein: said plastic core has a thickness of from about 12 μm to about 36 μm.

6. An entrance window for a gas filled radiation detector, as defined in claim 1, wherein: said electro conductive coating on said outside surface of said plastic core is selected from the group consisting of aluminum, nickel, and iconel.

7. An entrance window for a gas filled radiation detector, as defined in claim 6, further comprising: a layer of chromium of about 50-100 Å thickness applied onto said plastic core between said plastic core and said electro conductive layer.

8. An entrance window for a gas filled radiation detector, as defined in claim 6, wherein: said electro conductive layer is aluminum of about 400 Å thickness.

9. An entrance window for a gas filled radiation detector, as defined in claim 6, wherein: said electro conductive layer is nickel of about 200 Å thickness.

10. An entrance window for a gas filled radiation detector, as defined in claim 1, wherein: said electro conductive coatings on said inner side of said plastic core comprises: at least one pair of "A"/"B" layers, where "A" of a first inner layer is placed directly on said plastic core and "B" of a second inner layer is placed on layer "A".

11. An entrance window for a gas filled radiation detector, as defined in claim 10, wherein: said "A" layer is selected from the group consisting of chromium, nickel, silver, and gold.

12. An entrance window for a gas filled radiation detector, as defined in claim 10, wherein: said "A" layer is about 50-100 Å thick.

13. An entrance window for a gas filled radiation detector, as defined in claim 10, wherein: said "B" layer is selected from the group consisting of: aluminum or titanium.

14. An entrance window for a gas filled radiation detector, as defined in claim 10, wherein: said "B" layer is about 400-500Å.

15. An entrance window for a gas filled radiation detector, as defined in claim 1, wherein: said electro conductive coating on said inner side of said plastic core comprises: at least one set of "A"/"B"/"C" layers, where "A" of a first inner layer is placed directly on said plastic core, "B" of a second inner layer is placed on layer "A", and "C" of a third inner layer is placed on layer "B".

16. An entrance window for a gas filled radiation detector, as defined in claim 15, wherein: said "A" layer is chromium of about 50-100 Å thickness.

17. An entrance window for a gas filled radiation detector, as defined in claim 15, wherein: said "B" layer is selected from the group consisting of: aluminum and titanium.

18. An entrance window for a gas filled radiation detector, as defined in claim 15, wherein said "B" layers is about 300-400 Å thick.

19. An entrance window for a gas filled radiation detector, as defined in claim 15, wherein: said "C" layer is selected from the group consisting of: chromium, nickel, silver, and gold.

20. An entrance window for a gas filled radiation detector, as defined in claim 15, wherein: said "C" layer is about 200-300 Å thick.

21. An entrance window for a gas filled radiation detector, as defined in claim 10, wherein: said inner side is composed of multiple "A"/"B" layers.

22. An entrance window for a gas filled radiation detector, as defined in claim 15, wherein: said inner side is composed of multiple "A"/"B"/"C" layers.

* * * * *

UNITED STATES PATENT AND TRADEMARK OFFICE
CERTIFICATE OF CORRECTION

| | | |
|---|---|---|
| PATENT NO. | : 7,432,518 B2 | Page 1 of 1 |
| APPLICATION NO. | : 10/657861 | |
| DATED | : October 7, 2008 | |
| INVENTOR(S) | : Olshvanger et al. | |

It is certified that error appears in the above-identified patent and that said Letters Patent is hereby corrected as shown below:

Column 1, line 37, please replace "then" with --than-- therefore.
Column 2, line 24, please replace "is" with --in-- therefore.
Column 2, line 45, please delete "an."
Column 2, line 52, please insert --with-- between "window" and "good."
Column 3, line 48, please delete "is."
Column 5, line 10, please insert --to-- between "According" and "the."

Column 6, Claim 15, line 31, please replace "coating" with --coatings-- therefore.

Signed and Sealed this

Tenth Day of March, 2009

JOHN DOLL
*Acting Director of the United States Patent and Trademark Office*